(12) United States Patent
Konttori et al.

(10) Patent No.: US 10,104,292 B2
(45) Date of Patent: Oct. 16, 2018

(54) MULTISHOT TILT OPTICAL IMAGE STABILIZATION FOR SHALLOW DEPTH OF FIELD

(71) Applicant: Microsoft Technology Licensing, LLC, Redmond, WA (US)

(72) Inventors: Urho Konttori, Espoo (FI); Mikko Juhola, Espoo (FI); Eero Tuulos, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 39 days.

(21) Appl. No.: 15/228,723

(22) Filed: Aug. 4, 2016

(65) Prior Publication Data

US 2018/0041709 A1    Feb. 8, 2018

(51) Int. Cl.
*H04N 5/232*    (2006.01)
*G03B 13/00*    (2006.01)
*H04N 5/225*    (2006.01)

(52) U.S. Cl.
CPC ....... *H04N 5/23287* (2013.01); *H04N 5/2257* (2013.01)

(58) Field of Classification Search
CPC .. H04N 5/2226; H04N 5/2259; H04N 5/2356; H04N 5/23212
USPC .................................. 348/345, 349
See application file for complete search history.

(56) References Cited

U.S. PATENT DOCUMENTS

| | | | |
|---|---|---|---|
| 8,363,085 B2 | 1/2013 | Michrowski et al. | |
| 8,648,926 B2 | 2/2014 | Kunishige et al. | |
| 8,824,793 B2 | 9/2014 | Intwala et al. | |
| 8,830,381 B2 | 9/2014 | Uehara | |
| 9,025,874 B2 | 5/2015 | Fransson et al. | |
| 9,100,562 B2 | 8/2015 | Mohan et al. | |
| 9,111,579 B2 | 8/2015 | Meaney et al. | |
| 9,264,630 B2 | 2/2016 | Kakkori et al. | |

(Continued)

FOREIGN PATENT DOCUMENTS

WO    2014191350 A1    12/2014

OTHER PUBLICATIONS

Blain, Loz., "Google Camera app simulates lens blur on camera phones", Published on: Apr. 17, 2014 Available at: http://www.gizmag.com/google-camera-lens-blur/31705/.

(Continued)

*Primary Examiner* — Anthony J Daniels
(74) *Attorney, Agent, or Firm* — Klarquist Sparkman, LLP

(57) ABSTRACT

Described herein are methods for creating images with depth of field effects from plural image frames each having different tilt and/or focus properties. Exemplary methods comprise capturing plural image frames and adjusting the tilt axis of the camera and/or focus of the camera in between each shot. The plural image frames can then be combined to create desired depth of field effects, such as bokeh effects. One exemplary method comprises capturing a first image frame of a scene with a primary subject in focus, capturing at least a second image frame of the scene at a different tilt axis and with suitable alternative focus, and combining pixels from at least the first and second image frames based on a predetermined heuristic or algorithm to generate a resultant composite image with the desired depth of field effect (such as with a primary subject in focus and the background out of focus).

19 Claims, 13 Drawing Sheets

(56) References Cited

U.S. PATENT DOCUMENTS

| | | | |
|---|---|---|---|
| 9,288,392 B2 | 3/2016 | Chuang et al. | |
| 9,329,356 B2 | 5/2016 | Chao et al. | |
| 2010/0103311 A1* | 4/2010 | Makii | H04N 5/23293 348/369 |
| 2011/0280475 A1 | 11/2011 | Singhal et al. | |
| 2013/0050564 A1* | 2/2013 | Adams, Jr. | G06T 5/50 348/345 |
| 2013/0114884 A1* | 5/2013 | Chen | H04N 13/0022 382/154 |
| 2014/0125825 A1 | 5/2014 | Baer et al. | |
| 2014/0313362 A1* | 10/2014 | Heringslack | H04N 5/23293 348/222.1 |
| 2014/0368494 A1 | 12/2014 | Sakharnykh et al. | |
| 2015/0268333 A1* | 9/2015 | Schneider | G01S 7/4816 356/5.01 |
| 2016/0093032 A1 | 3/2016 | Lei et al. | |
| 2017/0019596 A1* | 1/2017 | Dunn | H04N 5/23241 |
| 2017/0070720 A1* | 3/2017 | Bishop | H04N 5/23229 |
| 2017/0249742 A1* | 8/2017 | Kadri | G06T 5/002 |
| 2017/0332016 A1* | 11/2017 | Miyakawa | H04N 5/23245 |

OTHER PUBLICATIONS

La Rosa et al., "Optical Image Stabilization (OIS)", ST life. augmented, white paper, 26 pages, date unknown.
"International Search Report and Written Opinion Issued in PCT Application No. PCT/US2017/044059", dated Oct. 13, 2017, 14 pages.
Kodama, et al., "Efficient Reconstruction of All-in-Focus Images through Shifted Pinholes from Multi-Focus Images for Dense Light Field Synthesis and Rendering", In IEEE Transactions on Image Processing, vol. 22, Issue 11, Jul. 17, 2013, pp. 4407-4421.

\* cited by examiner

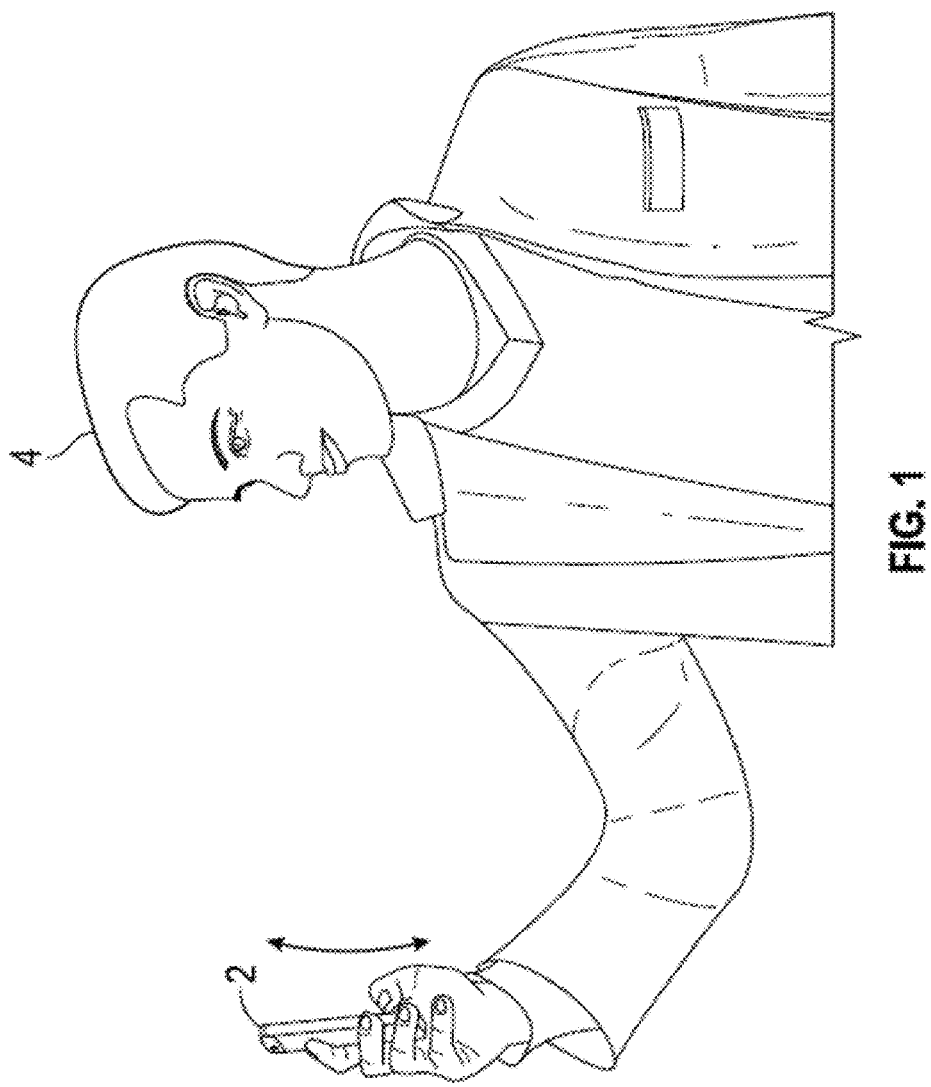

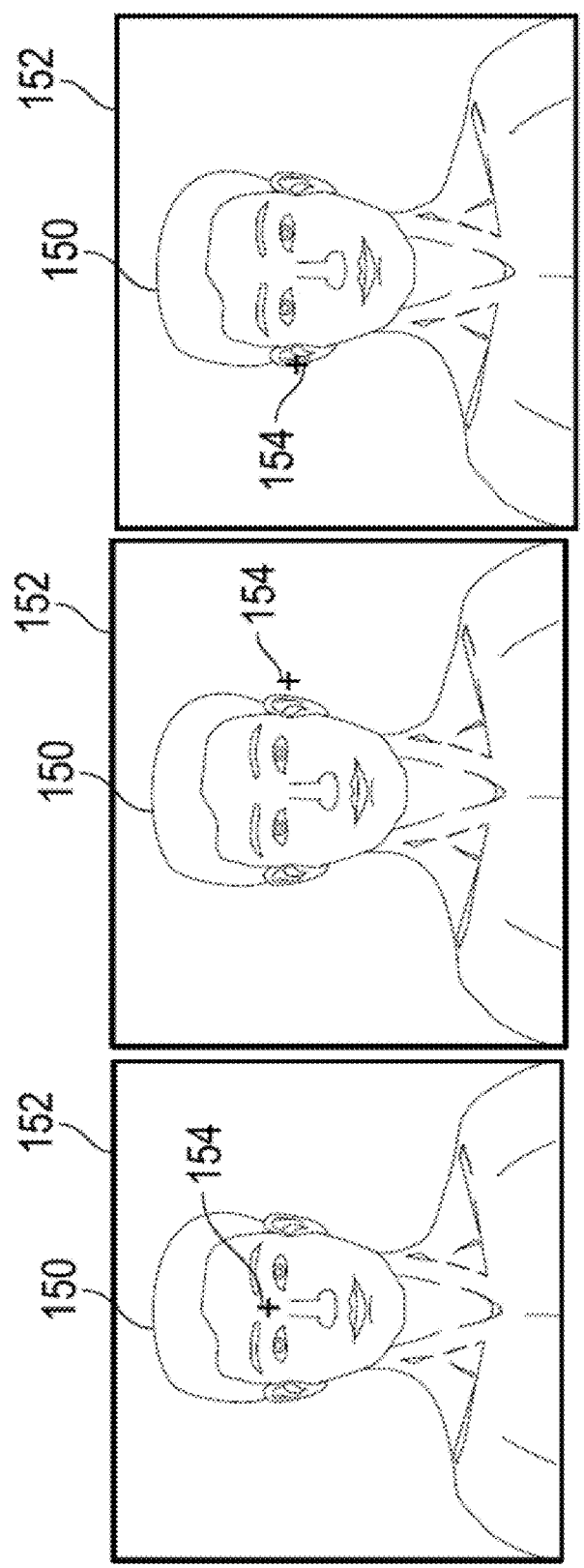

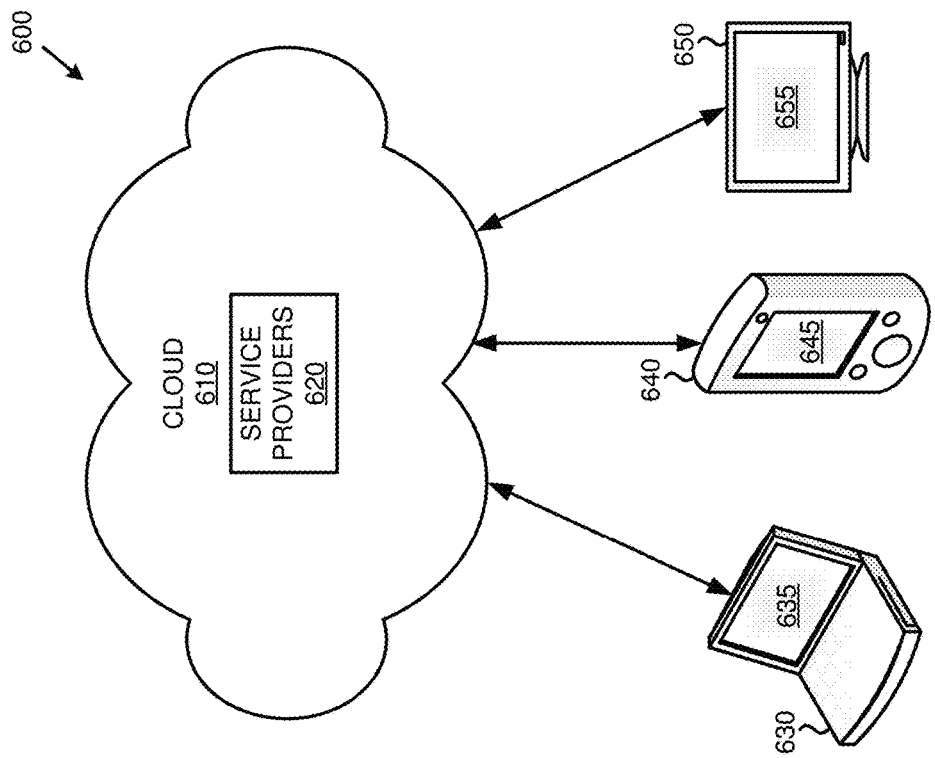

MULTISHOT TILT OPTICAL IMAGE STABILIZATION FOR SHALLOW DEPTH OF FIELD

BACKGROUND

Optical image stabilization (OIS) is a useful technology for providing improved image quality when images are taken by a camera that is shaking or otherwise not stationary. For example, cameras mounted on moving objects (e.g., cars, bicycles, helmets) or held by a person with in an outstretched arm (e.g., FIG. 1) are able to capture clearer, better focused images by utilizing OIS technology to counteract vibrations, shaking, and other motion of the camera. One type of OIS, known as "tilt OIS," is accomplished by pivoting or tilting the camera in response to the sensed motion of the structure to which the camera is mounted, allowing the camera to remain pointed in the desired direction and maintain a desired focus. Auto-focus (AF) technologies can also be used in conjunction with tilt OIS to provide images with better focus properties.

Sometimes it is desirable to capture images where part of the image is in focus and another part of the image is intentionally out of focus. This can be referred to as a "depth of field effect." Some depth of field effects are known as "bokeh effects." Bokeh typically refers to the appearance of the out of focus portions of an image, such as a blurry, blotted, or swirly appearance of a background located behind the focus plane that includes the primary object of the image. Photographers often deliberately use bokeh or other depth of field effects to create images with prominent out of focus regions with desired aesthetic qualities.

Typical mobile phone cameras have small lenses and small image sensors, with a limited depth of field range, and thus are often not optically able to create naturally beautiful bokeh effects, or other similar depth of field effects. Tilt OIS technology in combination with AF technology can be used in mobile phone cameras and other small cameras to create such a shallow depth of field effect, but only on one axis due to the optical distortion created by tilt of the lens stack and natural one axis shallow depth of field. This is known as the Scheimpflug principle. A typical use of this principle, e.g., in landscape photography, is to tilt the lens sufficiently to keep both near and far in focus with a single image. However, this does not help when it is desired to create an image with a depth of field effect where part of the image is to be in focus and another part is to be starkly out of focus, as in bokeh. A further problem with typical tilt based blur is that due to the optical effect, the shallow depth of field shape is wedge shaped. This makes it very difficult to use it for generic images, and care must be applied in choosing how this sharp depth of field passes on the subjects.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein are methods for creating images with desired depth of field effects from plural image frames each having different tilt and/or focus properties. Exemplary methods comprise capturing plural image frames (or shots) and adjusting the tilt axis of the camera and/or focus of the camera in between each shot. The plural image frames can then be combined either automatically or with assistance by a user (or both) to create desired depth of field effects, such as bokeh effects. One exemplary method comprises capturing a first image frame of a scene with a primary subject in focus, capturing at least a second image frame of the scene at a different tilt axis and with suitable alternative focus, and combining pixels from at least the first and second image frames based on a predetermined heuristic or algorithm to generate a resultant composite image with the desired depth of field effect (such as with a primary subject in focus and the background out of focus).

Such depth of field effects can be also be created for a viewfinder using analogous techniques, for example in a mode with fewer shots per frame, or in a manner of a rolling buffer when image content is detected as sufficiently static. An example of a user assisted mode is where a user touches a screen to take an image and the set of differently tilted images that are captured are optimized based on the subject at the point of contact. In a fully automatic setup, for example, normal autofocus (AF) can be used to determine or calculate optimal focus positions and a rotation/tilt pattern can be adjusted to be optimized for that location.

In some methods, capturing at least the second image frame can comprise selecting a suitable defocus pixel or point based on a desired defocus level. In some embodiments, a crude depth map of the scene may be generated and used to identify a more complex spread of optimal focus points and the rotations/tilts can optionally be optimized for all or some of the positions. Exemplary multi-frame methods for generating a desired depth of field effect can comprise one or more of the following steps: capturing multiple image frames having a subject, adjusting a tilt axis between the image frames, determining a depth map from at least some of the multiple image frames, filtering source frames based on a selected heuristic or algorithm, and combining the source frames. In some embodiment, the method can further comprise filtering the subject and/or filtering a background of the subject.

In another aspect of the disclosed technology, a full set of the different images can be stored for post-process refocusing of the image(s). Depending on the amount of stored images, a quite comprehensive lightfield may be stored.

As described herein, a variety of other features and advantages can be incorporated into the technologies as desired.

BRIEF DESCRIPTION OF THE DRAWINGS

FIG. 1 shows a person holding a camera device with an arm extended, resulting in involuntary shaking of the camera device due to physiological phenomena.

FIGS. 7A-7C illustrate different tilt angles and focus locations relative to a person's head that is the primary object in a scene. In FIG. 7A, the camera is pointed at the middle of the person's head with the person in focus and the background out of focus. In FIG. 7B, the camera is pointed to the right of the person's head with the background in focus. In FIG. 7C, the camera is pointed at the boundary between the person's head and the background.

FIG. 13 illustrates exemplary electronic devices that can implement the disclosed technology, in an exemplary cloud-based communication and computing environment.

DETAILED DESCRIPTION

Figure 2B:
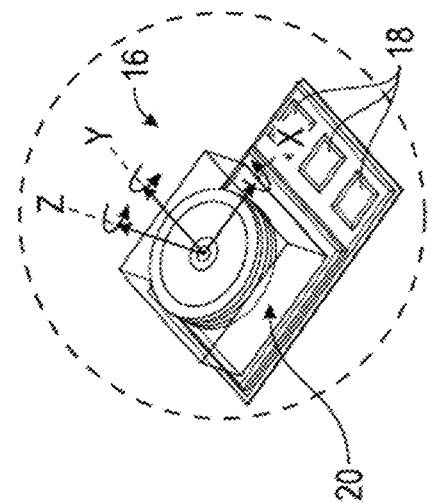
FIG. 2B is a perspective view showing the exemplary camera module of FIG. 2A and illustrates exemplary orthogonal X-Y-Z axes and corresponding pitch, yaw, and roll rotation directions for the camera.

Described herein are cameras and related electronic devices, systems, components, and methods for generating images with desired depth of field effects using tilt optical image stabilization (OIS) and autofocus (AF) technology. The disclosed technology can be used to generate a desired image from a combination of two or more different images having varying tilt, depth of field, and/or focus properties. Successive image frames can be captured with the camera at different tilt angles and/or focus planes for each image, for example. The plural or multiple image frames can be combined to create desired depth of field effects (e.g., bokeh effects) where part of the resulting image is in focus and other parts are intentionally out of focus. The images can be digitally combined at the pixel level, for example.

The electronic devices described herein (e.g., the device in which the camera is mounted) can be any type of electronic device that includes a camera, such as traditional dedicated camera devices, handheld mobile computing devices (e.g., camera phone, smart phone), mobile gaming device, laptop computer, watch, gaming controller, flying machine (e.g., quadcopter, glider, drone), modular camera devices that can be mounted to another moving object (e.g., GoPro® devices), camera devices fixed in or to other moving objects (e.g., cameras mounted in cars, bikes, or other vehicles), and any other devices that include or are configured to be coupled to a camera device such that the camera device is in motion while capturing images.

Optical Image Stabilization

Image Stabilization (IS) technology is effective for delivering improved image quality in various types of cameras. Technologies for IS can significantly improve camera shutter speed and offer precise suppression of camera vibration/shaking. IS can be implemented via Digital Image Stabilization (DIS), Electronics Image Stabilization (EIS) and Optical Image Stabilization (OIS), for example. Each of these technologies can produce different image quality results. Undesirably, DIS and EIS can require large memory and computational resources on the hosting devices, while OIS can acts directly on the lens position itself and can minimize memory and computation demands on from the host device. As an electromechanical method, lens stabilization provides one of the most effective methods for removing or canceling blurring effects from involuntary hand motion or similar shaking of the camera.

As camera devices have become smaller and lighter, with higher and higher resolutions, the impact of blurring on image quality caused by involuntary motions of the camera device have increased. In addition, the introduction of larger displays and viewfinders and the popularity of taking "selfies" has encouraged users to take pictures with outstretched arms (see, e.g., FIG. 1) and/or with selfie sticks, further increasing blurring caused by involuntary motion of the camera. Accordingly, IS in smartphones and other handheld camera devices enables pictures and video with greatly improved quality comparable to digital still cameras in many operating conditions.

Picture blurring caused by hand jitter, a physiological phenomenon occurring at a frequency below 20 Hz, for example, is even more evident in higher resolution cameras. In smaller resolution cameras the blurring may not exceed one pixel, which is negligible; but in higher resolution cameras blurring may impact many pixels, degrading image quality significantly. OIS technology minimizes the effects of involuntary camera shake or vibration. For example, OIS can sense the vibration on the hosting system and compensate for these camera movements to reduce vibration/shaking effects. For example, OIS can enable the capturing of sharp images at shutter speeds much slower (e.g., 5-10 times slower) than otherwise possible without OIS.

The increase of the shutter opening time permits more brilliant and clear pictures in indoor or low-light conditions, for example. Of course, the longer the exposure time, the greater the potential for hand shaking or other camera motion to cause blurring. With smartphone cameras, for example, because of their small lens apertures and other properties, the cameras can require a relatively higher exposure time compared to cameras with larger lenses, with the drawback of increasing the detrimental effect due shaking/vibration.

In contrast to DIS, OIS does not require post-processing algorithms on the captured frames. Instead, OIS controls the optical path between the target (light source) and the image sensor by moving mechanical parts of the camera itself, so even if the camera shakes, the OIS can ensure that light arriving to the image sensor does not change trajectory. Note that OIS compensates for motion of the camera itself (e.g., caused by hand jitters), not for motion of the target object, and so OIS is not necessarily helpful for reducing blur when photographing a moving car, for example.

Involuntary motion of a person's outstretched hand/limb can be referred to as "tremor." Tremor is a natural physiological phenomenon present in all humans. Tremor can produce an involuntary oscillatory movement of body parts directly generated by muscles during their activities when they contract and relax repetitively. With reference to FIG. 1, tremor motion is illustrated with arrows, causing the user 4 to move the camera device 2 in his outstretched hand involuntarily. Physiological tremor may not be visible to the naked eye even when the consequences of tremor are visible as the blurring effect in pictures. In some examples, tremor can be defined as an oscillating motion with an amplitude less than 0.5 degrees and a frequency in the range 0-20 Hz.

Tilt OIS

OIS can implemented using electromechanical components in combination with traditional camera components like lenses and image sensors and computing components like processors and memory. In small cameras, such as for smartphones, very small electromechanical components are used for OIS.

Figure 2A:
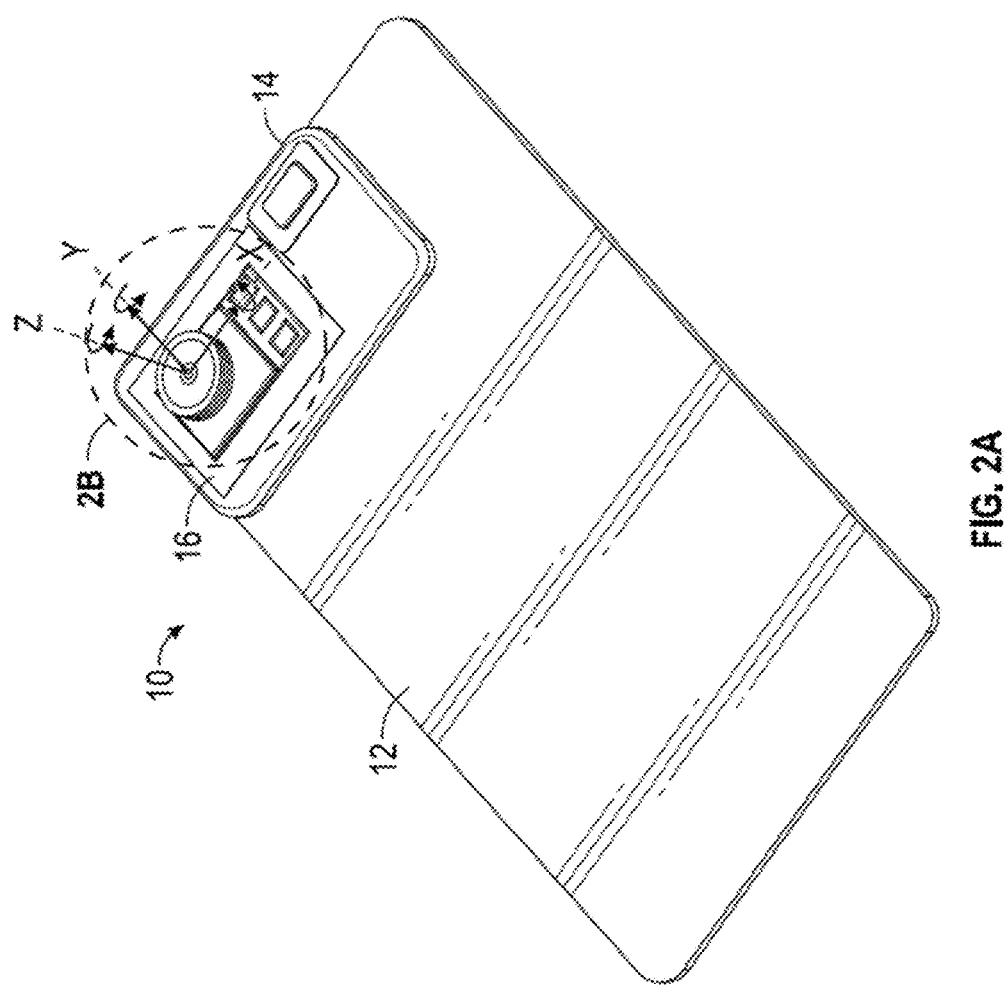
FIG. 2A is a perspective view showing an exemplary mobile electronic device (e.g., a camera phone) that includes a camera module.

FIG. 2A shows an exemplary electronic device 10 that includes a rigid body 12 that holds an imaging module 14 comprising a camera module 16. FIG. 2B shows the exemplary camera module 16 in isolation. The camera module 16 can include various components, including the camera 20 (including OIS components) and other components 18 mounted on an integrated circuit or similar board, such as a microcontroller, memory, driver, gyroscope, power source, actuators, communications, photo sensors, Hall sensors, other sensors, etc. The camera 20 can include lenses, image sensors, actuators, shutters, sensors, and/or other components to enable image capture, OIS, autofocus, and/or other functionalities.

Depending on the architecture used to build the camera modules, OIS can be implanted via camera shift (e.g., tilt OIS), lens shift, and/or other technologies. In lens shift OIS, the image sensor is generally fixed and the lens moves with a translational movement relative to the image sensor to compensate for perceived motion of the image sensor. In tilt OIS, the image sensor and the lens tilt/pivot in unison to compensate for perceived motion of the camera frame/body in which the lens and image sensor are mounted. (Here, one lens is described for simplicity, though of course multiple lenses (e.g., in a lens stack) are often used in such cameras.)

Figure 3B:
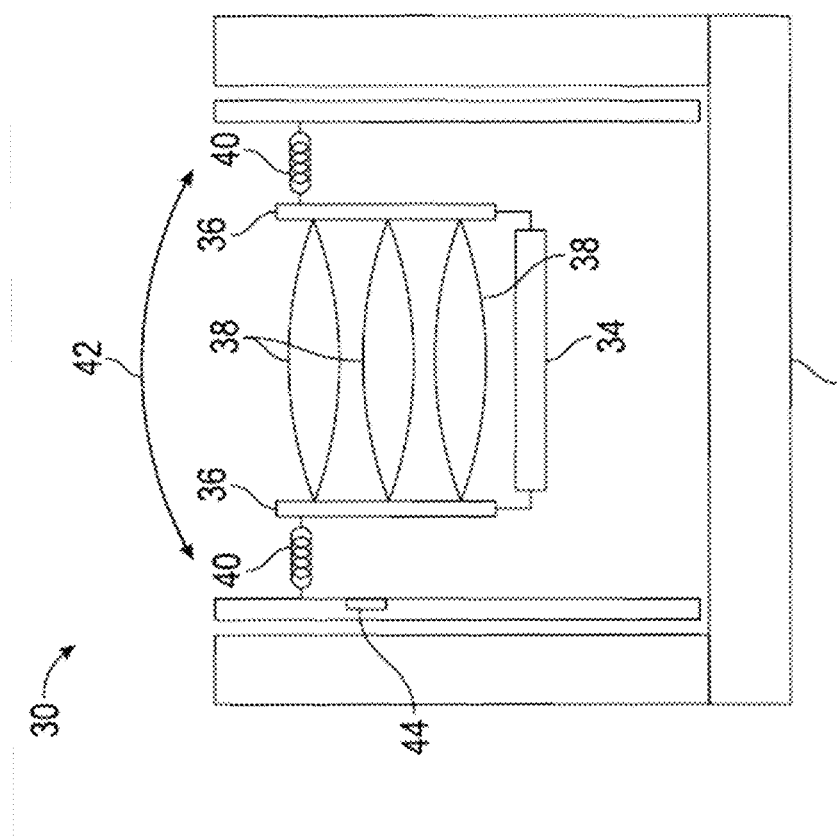
FIGS. 3A and 3B are schematic diagrams illustrating a camera with tilt-based optical image stabilization (tilt OIS) technology from a side.
Figure 3A:
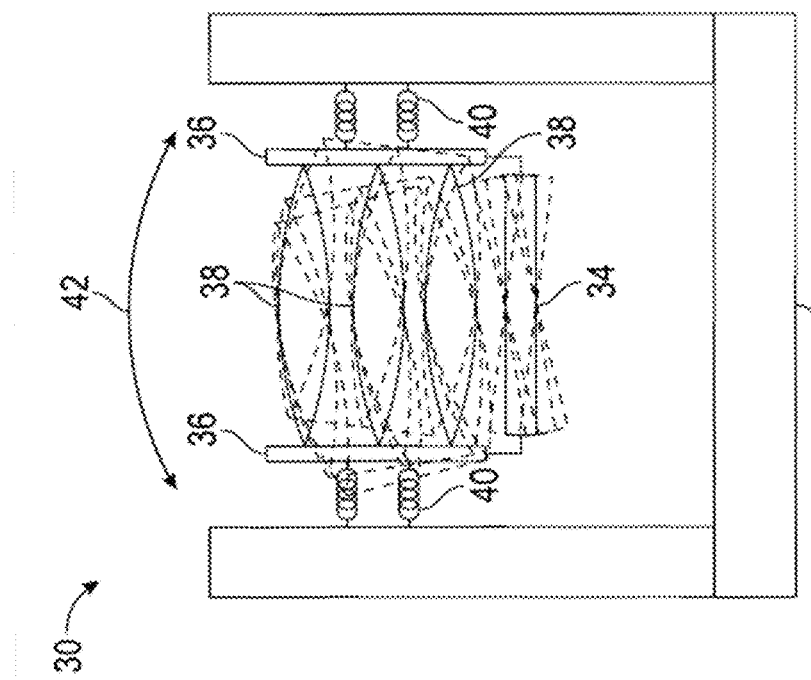

FIGS. 3A and 3B schematically illustrate an exemplary camera 30 with tilt OIS technology. The camera 30 comprises a rigid frame 32 that can be fixed relative to the host device (e.g., a smartphone). The image sensor 34 and lenses 38 can be mounted in a common inner camera frame 36 that is tiltable relative to the rigid frame 32 via actuators 40. Any number of actuators 40 can be used. Acting in response to control signals, the actuators 40 can cause the lenses and image sensor to tilt/pivot/rotate (see arrow 42) in unison inside the rigid frame 32 to change to tilt angle that the camera is pointing. FIGS. 3A and 3B only show a one-dimensional tilt axis, however, the illustrated structure and tilting motion can be carried out in three dimensions to provide two-dimensional camera tilting.

With reference to FIG. 2B, the direction the lenses and image sensor are pointing can be referred to as the Z axis (also referred to as the focus axis, the longitudinal axis, and the roll axis), and the two orthogonal axes are the X axis (or pitch axis) and the Y axis (or yaw axis). The tilting motion 42 shown in FIGS. 3A and 3B can occur about the X axis and/or about the Y axis, providing a two-degree range of tilt motion to compensate for motion in the X or Y axis. Autofocus (AF) technology can also be included to move the lenses and/or image sensor apart and/or toward each other to change the focus properties of the camera along the Z axes. AF can also be used along with tilt OIS to compensate for shaking/vibration motion in the Z axis. A gyroscope of other suitable sensor can be included to determine the orientation and motion of the host device and enable compensatory motion by the actuators.

The tilt OIS actuators (e.g., actuators 40) can comprise any type of suitable actuators, such as liquid lens (LL) actuators, shape memory alloy (SMA) actuators, piezo-electric motor actuators, Voice Coil Motor (VCM) actuators, and/or other types of actuators. For example, VCM actuation exploits the interaction between a current-carrying coil winding and the field generated by a permanent magnet. The coil and the magnet, one in front of the other, are attached to sides of the camera housing (e.g., frame 32). When a current is applied to the coil, the interaction between the fixed and electrically-generated magnetic fields by the coil generates a force that causes the inner camera frame 36 to move by a distance proportional to the current applied.

As shown in FIG. 3B, the camera 30 can also include one or more position sensors 44 for detecting the movement and/or position of the inner camera frame 36. The position sensors 44 can be of various types and can be mounted in various manners to retrieve the desired position information, for example using photo sensors mounted to a lateral wall of the outer frame 32 as illustrated in FIG. 3B.

Figure 4:
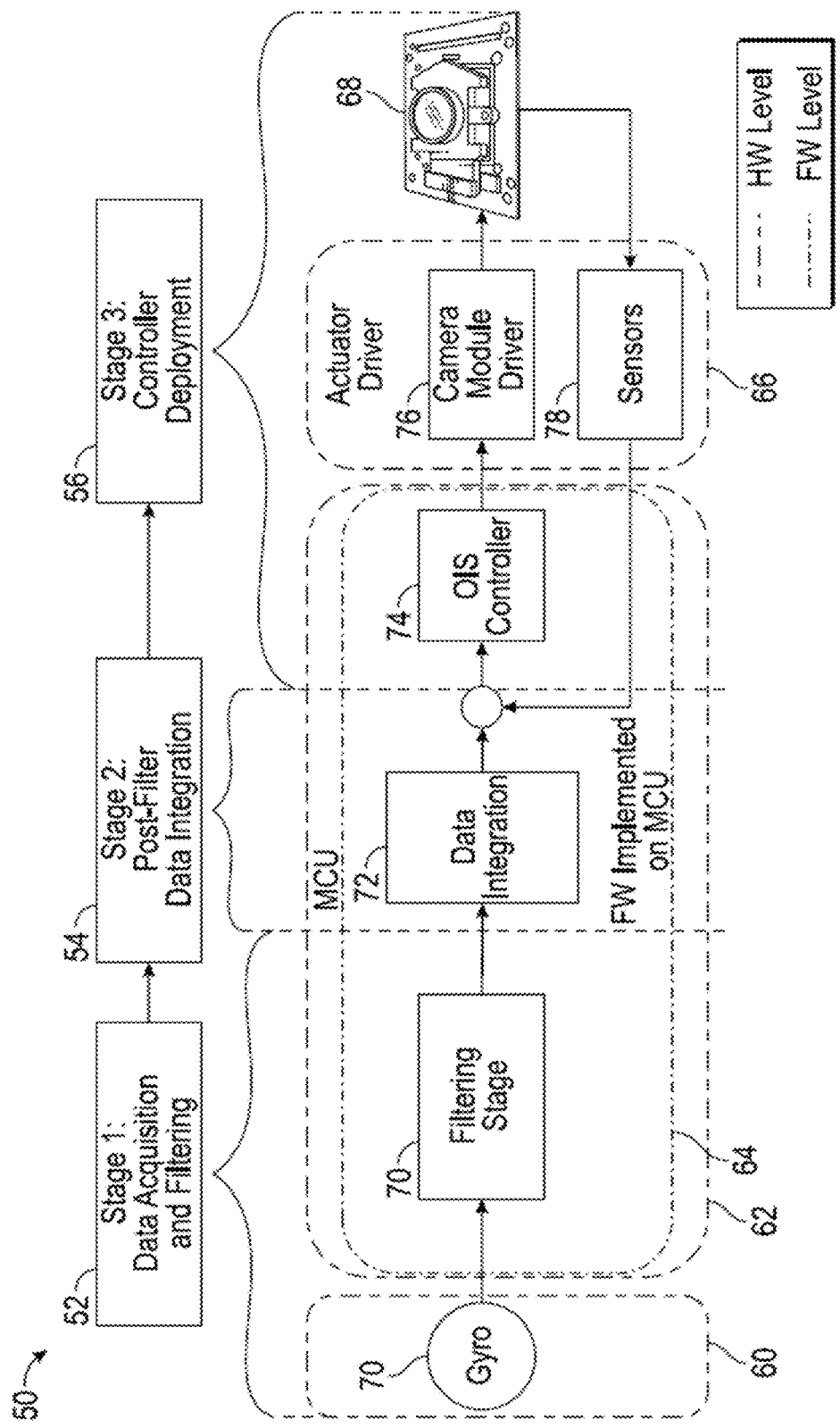
FIG. 4. is a flow diagram illustrating an exemplary camera system and imaging process utilizing optical image stabilization.

An exemplary tilt OIS control process 50 is illustrated in FIG. 4 along with the associated OIS hardware and firmware. The process 50 can include a data acquisition and filtering stage 52, a post-filter data integration phase 54, and a controller deployment stage 56. The OIS system is divided structurally into a gyroscope module 70 including the gyroscope, a microcontroller module 62 including firmware implemented on the microcontroller unit, an actuator driver module 66 including actuators 76 and position sensors 78, and the camera module 68 including lenses and image sensor.

In the data acquisition and filtering stage 52, angular rate data and/or other data is acquired by the gyroscope 70. In addition, the current camera position can also be obtained via position sensors 78. The angular rate, acceleration, and/or other acquired data can be filtered at 70, such as to reduce offset drift contribution.

In the post-filter data integration stage 54, the filtered angular rate data can be integrated at 72, obtaining the relative angular displacement caused by jitter.

Then, in the controller deployment stage 56, an OIS controller 74 processes the angular displacement and the camera position data and outputs a control signal to the camera module driver 76 to compensate for the jitter effect. The camera module driver 76 then directly causes the camera module 68 to tilt to compensate for the jitter motion. The sensors 66 continually determine the new movement/positions of the camera module 68 and feed that data back to the OIS controller in a control loop, along with new data from the gyroscope, to maintain image stabilization. The control loop operative frequency can operate with sufficiently high frequency based on the given image capture conditions, such as in the 500 Hz to 5 kHz range for an OIS system having a camera module having a standard resonance frequency around 100 Hz.

More information regarding exemplary OIS systems and tilt OIS systems in particular can be found in U.S. Pat. Nos. 9,264,630 and 9,329,356, which are hereby incorporated by reference herein in the entireties.

Multi-Frame Composite Images with Depth of Field Effects

As discussed above, an image with a depth of field effect can be created by capturing plural image frames and combining them together. Each of the different image frames can be taken with different properties, such as with the camera at different tilt angles, with different objects in focus and out of focus, etc. The different tilt angles can be accomplished using the tilt OIS technology.

Figure 5:
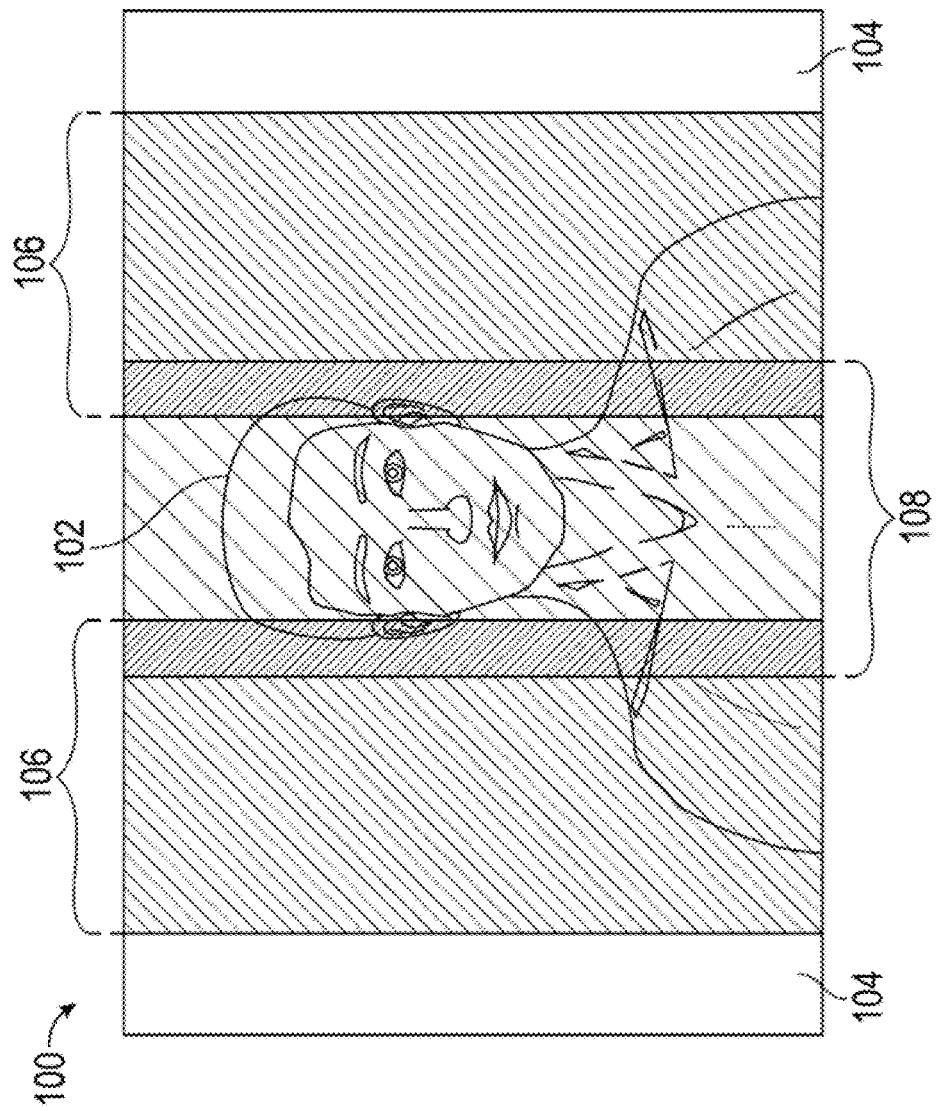
FIG. 5 illustrates three overlapping images of a scene taken at varying tilt positions.

FIG. 5 illustrates how plural image frames can be taken to capture different portions of a scene and can then be combined to generate a composite image with desired depth of focus effects. The scene 100 in FIG. 5 includes a primary object 102 (e.g., a person) and a background 104. In the example of FIG. 5, three different image frames are captured of the scene 100 with the camera at different tilt angles. Two frames 106 are taken of lateral regions including a lateral part of the primary object 102 and the background 104 (e.g., centered just on the background 104 to the side of the primary object 102), and frame 108 is taken centered on the primary object 102, optionally with portions of the background 104 included on either side. Some overlap can exist between each adjacent image frame, such that parts of each image frame in the overlapping region can be selected and combined to produce the resulting image. For example, the image frame 108 can be focused on the person's head with a normal focus plane, leaving both the person's head and the background just to the side of the head generally in focus. At the same time, the lateral image frames 106 can maximize defocus of the portion of the background directly behind the person's head. When combining the image frames 106 and 108, the defocused/blurry background pixels can be selected for the overlapping region and the focused/sharp foreground pixels including the head can be selected, creating a depth of field effect where the head is clear and sharp but background is out of focus. Some blending can also be applied between the different defocus regions.

Figure 6C:
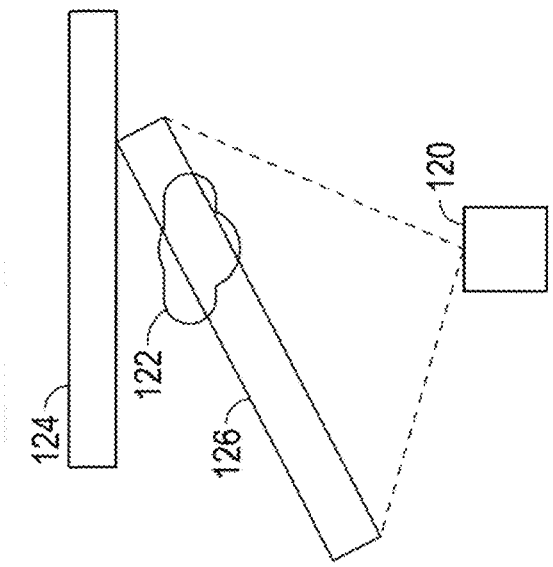
FIG. 6C illustrates the camera capturing yet another image frame of the scene with a different tilted lens position with the primary subject in focus and a variable separation between the focus plane and the background, this time with a larger separation on the left of the primary object than on the right. This emphasizes depth of field on the left side.
Figure 6B:
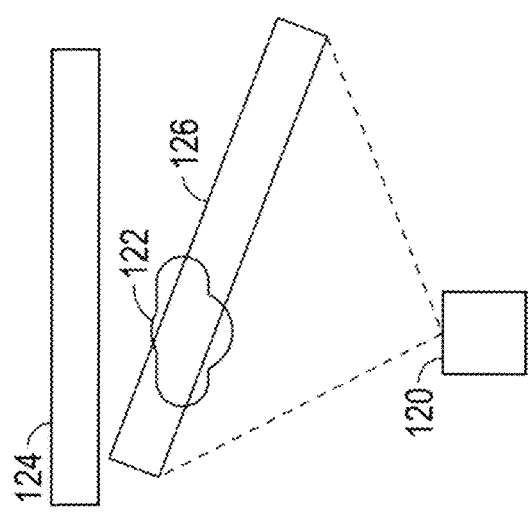
FIG. 6B illustrates the camera capturing another image frame of the scene with a tilted lens position with the primary subject in focus and a variable separation between the focus plane and the background, with a larger separation on the right of the primary object than on the left. This emphasizes depth of field on the right side.
Figure 6A:
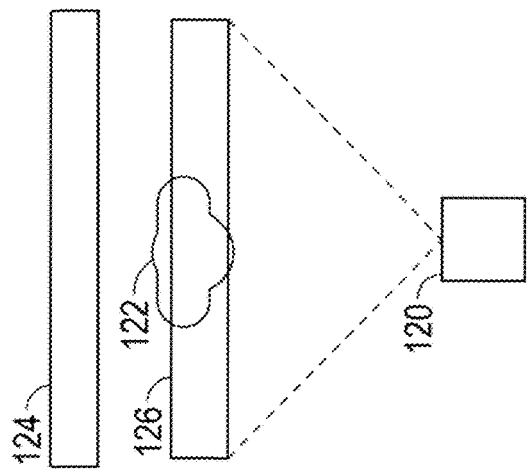
FIG. 6A illustrates a camera capturing an image frame of a scene including a primary object and a background, with normal focus such that there is even separation between the primary subject and the background.

FIGS. 6A-6C show exemplary camera tilt and focus plane positions for capturing the three image frames illustrated in FIG. 5. FIG. 6A illustrates a camera 120 capturing an image frame of a scene including a primary object 122 and a background 124, with the focus plane 126 in a normal plane of object 122, such that there is even separation between the focus plane 126 and the background 124 on either side. The center image frame 108 in FIG. 5 can be captured with the camera in the tilt position of FIG. 6A.

FIG. 6B illustrates the camera 120 capturing another image frame of the scene with a right-tilted lens position with the primary subject 122 in focus and a variable separation between the focus plane 126 and the background 124, with a larger separation on the right of the primary object than on the left. This emphasizes depth of field on the right side, and thus the right image frame 106 in FIG. 5 can be captured with the camera in the tilt position of FIG. 6B.

Similarly, FIG. 6C illustrates the camera 120 capturing another image frame of the scene with a left-tilted lens position with the primary subject 122 in focus and a variable separation between the focus plane 126 and the background 124, with a larger separation on the left of the primary object than on the right. This emphasizes depth of field on the left side, and thus the left image frame 106 in FIG. 5 can be captured with the camera in the tilt position of FIG. 6C.

FIGS. 7A-7C illustrate an example of plural image frames that can be captured of a human portrait and combined to create a portrait image with a desired depth of field effect. In FIG. 7A, the image frame the focus point 154 is centered on the subject's face 150. In the image frame of FIG. 7B, the focus point 154 is on the background 152 just to the side of the face 150. In the image frame of FIG. 7C, the focus point 154 is on a boundary between the face 150 and the background 152 (e.g., the subject's ear or side of the subject's head). In FIG. 7C, the focus point 154 is intended to be at the boundary between the portion of the image that is intended to be in focus (e.g., the face 150) and the portion of the image that is intended to be out of focus (e.g., the background). Facial recognition technologies can be used to help determine the boundaries of a person's face or head. The process of determining the boundaries between different features in an image is sometimes referred to as "segmentation." Two or all three of the images in FIGS. 7A-7C (optionally additional image frames as well) can be combined together to generate a composite image with the desired depth of field effect, selecting certain in focus pixels from the various image frame and selecting other out of focus pixels from the various image frames. For example, the person's head 150 can be in focus with the background 152 out of focus in the resulting image.

Figure 8:
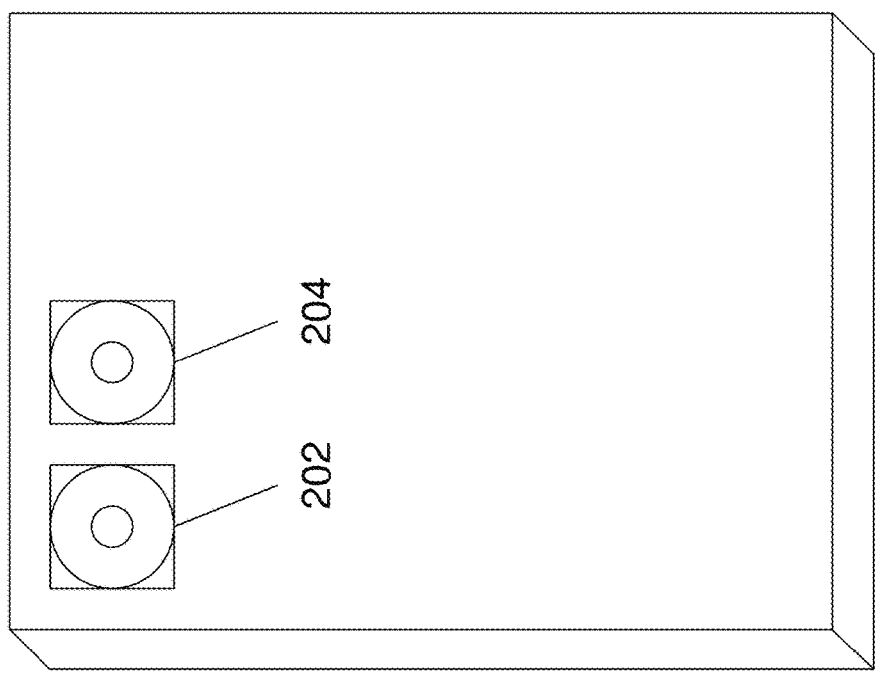
FIG. 8 shows an exemplary device that includes two different cameras that can be utilized in conjunction to implement technologies disclosed herein.

Plural image frames can be captured using the same camera in successive shots, as described above. In other embodiments, two or more different cameras can be used to capture plural image frames with different focus properties. For example, FIG. 8 shows an exemplary host device 200 that includes two cameras 202 and 204. The two cameras can capture two images of a scene at the same time, or sequentially. The different images captured by the two cameras 202, 204 can be focused on different locations/portions of a scene (e.g., camera 202 can be focused on the primary subject in the foreground and the camera 204 can be focused on the background). The two different cameras of a host device may also or alternatively be different types of cameras, e.g., one full spectrum color camera and one high resolution R-G-B camera (which can help with low-light imaging). Similarly, one or both cameras may include tilt OIS technology and/or other OIS technology. The image frames captured by the two cameras 202 and 204 can be combined to generate a composite image of a scene with the desired depth of field effect. In other embodiment, three or more cameras can be used to capture different image frames that can then be combined.

Figure 9:
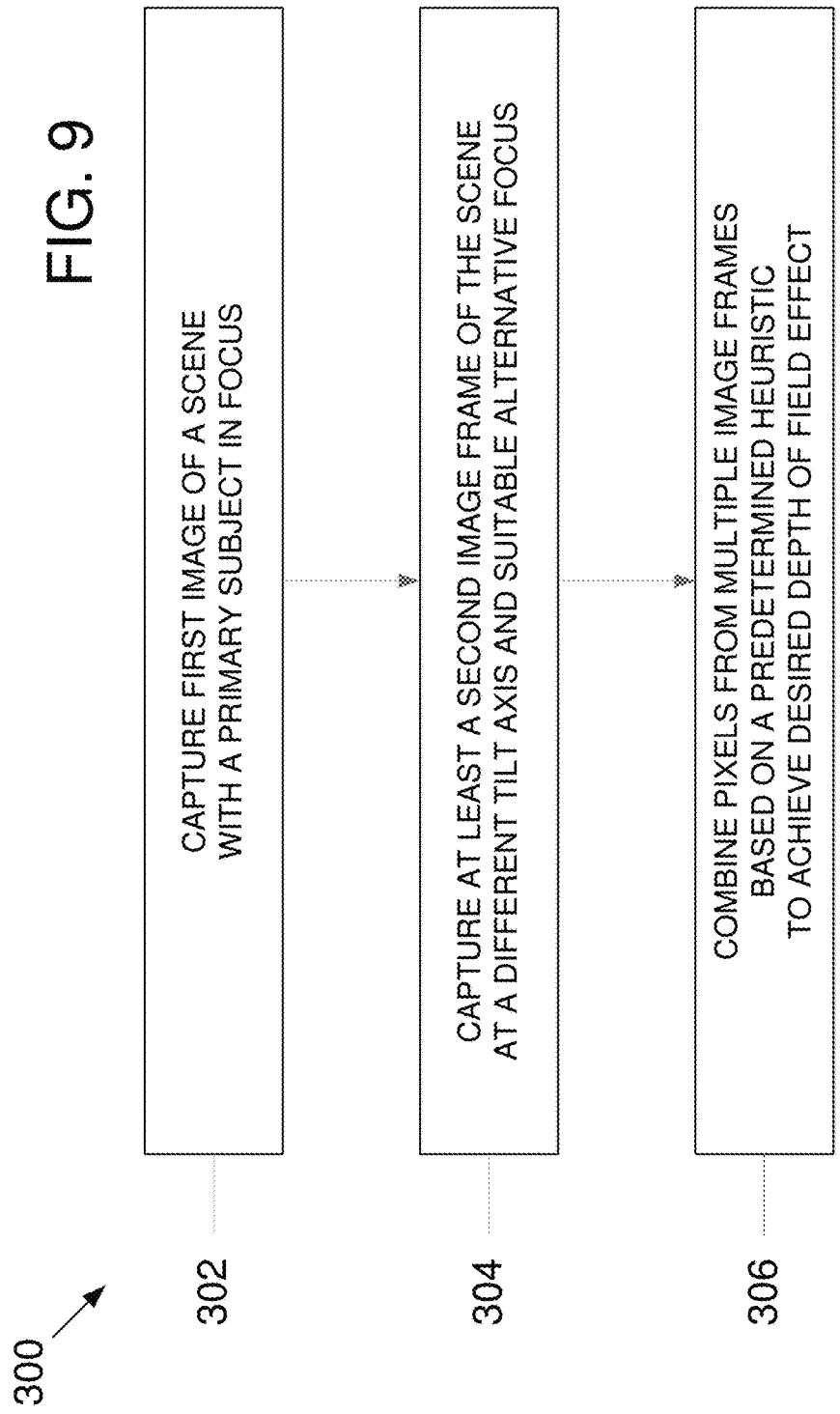
FIG. 9 is a flow chart illustrating an exemplary method disclosed herein.

FIG. 9 is flow chart illustrating an exemplary method 300 utilizing the disclosed technology. At 302, the method can comprise capturing a first image frame of a scene with a primary subject in focus. This can comprise, for example, utilizing autofocus to ensure the primary subject is in the focus plane. The first image frame can include all of the primary subject along with some background. The background may also be in focus in the first image frame. At 304, the method can comprise changing the tilt axis of the camera and capturing at least a second image frame of the scene at a different tilt axis than the first image frame and with a suitable alternative focus. For example the second image frame can be captured with a tilted focus plane that maximizes defocus on one side of the primary subject. Any number of additional image frames can also be captured of the scene with different tilt axes and different focus planes to capture desired focus/defocus properties of various portions of the scene. At 306, the method can comprise combining pixels from the plurality of different image frames taken of the scene based on a selected (e.g., predetermined) heuristic or algorithm to produce an image of the scene with a desired depth of field effect.

In some embodiments, a depth map of the scene can be created to assist in selecting which pixels are to be in focus and which pixels are to be out of focus in a resulting image. A depth map can be created that includes data for each pixel of an image representing how far the particular pixel is from the camera. The depth map can also be less detailed, using coarser groups of pixels rather than distinguishing the depth of each pixel. From the depth map, the heuristic or algorithm can determine which portions of the scene should be in focus (e.g., the closer regions) and which portions of the scene should be out of focus (e.g., the more distant regions).

The disclosed technology is not limited to single axis camera tilting. A tilt OIS system can allow the camera to be tilted in two axes, such as side-to-side (as illustrated in FIGS. 3A and 3B and in FIGS. 5-7) and up-and-down, or in two diagonal axes. Thus, composite images can be formed from plural image frames taken at any location along the two-dimensional scene perpendicular to the depth axis (Z-axis/focus axis). For example, expanding on the example in FIGS. 5 and 6, two additional image frames can be captured, one above the center image frame 108, and one below the center image frame 108, to provide additional ability to create focus contrast at the top and bottom of the primary subject where the transition to the background occurs. Thus, the disclosed technology can be extended or applied to any desired two dimensional depth of focus effect.

Exemplary Camera Systems, Host Devices and Computing Environments

Figure 10:
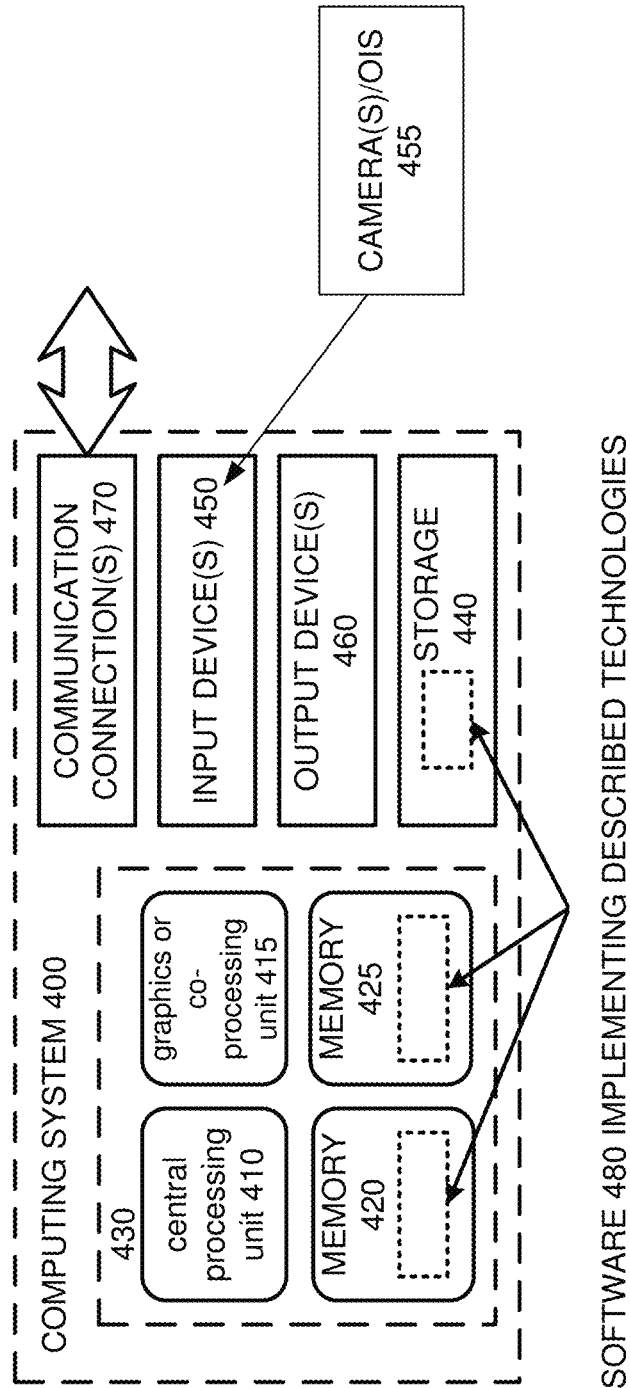
FIG. 10 illustrates an exemplary computing environment for a device implementing the disclosed technology.

FIG. 10 depicts a generalized example of a suitable computing system 400 in which the described innovations may be implemented. The computing system 400 is not intended to suggest any limitation as to scope of use or functionality, as the innovations may be implemented in diverse general-purpose or special-purpose computing systems.

The computing system 400 includes one or more processing units 410, 415 and memory 420, 425. In FIG. 10, this basic configuration 430 is included within a dashed line. The processing units 410, 415 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 410 as well as a graphics processing unit or co-processing unit 415. The tangible memory 420, 425 may be volatile memory (e.g., registers, cache, RAM), non-volatile memory (e.g., ROM, EEPROM, flash memory, etc.), or some combination of the two, accessible by the processing unit(s). The memory 420, 425 stores software 480 implementing one or more innovations described herein, in the form of computer-executable instructions suitable for execution by the processing unit(s).

A computing system may have additional features. For example, the computing system 400 includes storage 440, one or more input devices 450, one or more output devices 460, and/or one or more communication connections 470. The input device 450 can include one or more cameras and can include the disclosed optical image stabilization (OIS) technology 455 disclosed herein. An interconnection mechanism (not shown) such as a bus, controller, or network interconnects the components of the computing system 400. Typically, operating system software (not shown) provides an operating environment for other software executing in the computing system 400, and coordinates activities of the components of the computing system 400.

The tangible storage 440 may be removable or non-removable, and includes magnetic disks, magnetic tapes or cassettes, CD-ROMs, DVDs, or any other medium which can be used to store information and which can be accessed within the computing system 400. The storage 440 stores instructions for the software 480 implementing one or more innovations described herein.

The input device(s) 450 may be a touch input device such as a keyboard, mouse, pen, or trackball, a voice input device, a scanning device, or another device that provides input to the computing system 400. For video encoding, the input device(s) 450 may be a camera (including OIS technology 455), video card, TV tuner card, or similar device that accepts video input in analog or digital form, or a CD-ROM or CD-RW that reads video samples into the computing system 400. The output device(s) 460 may be a display, printer, speaker, CD-writer, and/or another devices that provide output from the computing system 400.

The communication connection(s) 470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

Figure 11:
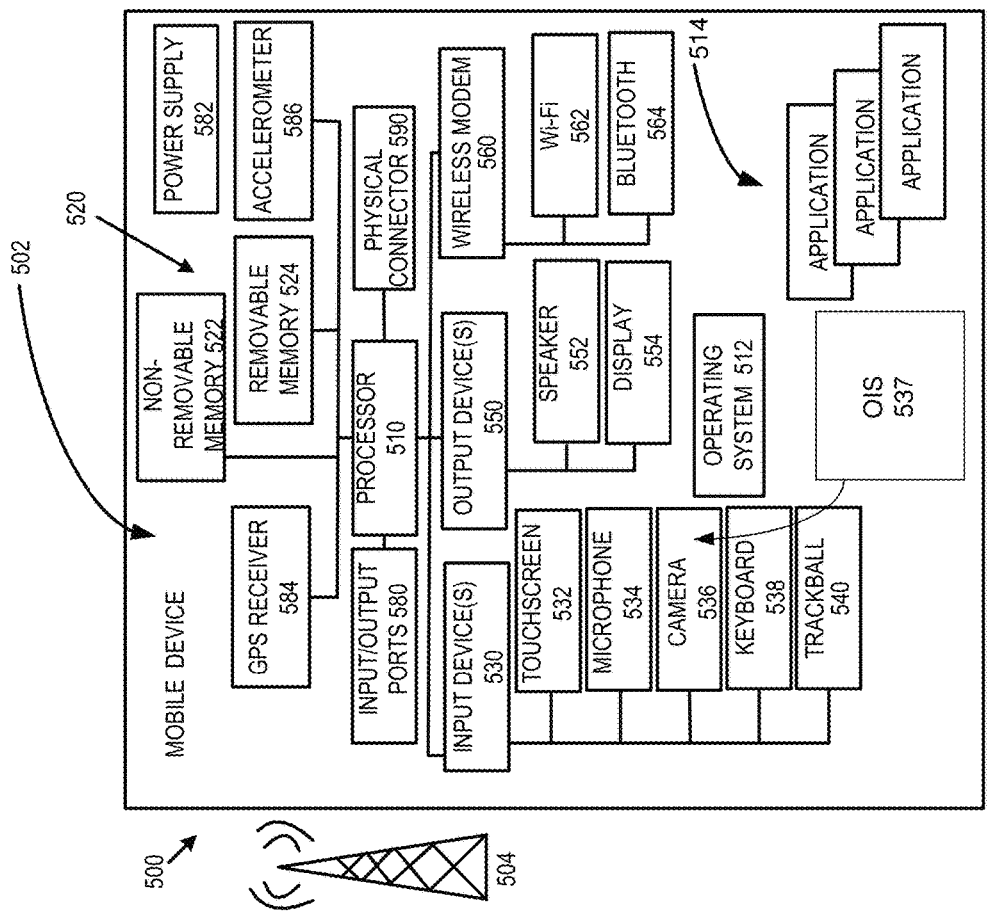
FIG. 11 illustrates an exemplary mobile electronic device implementing the disclosed technology.

FIG. 11 is a system diagram depicting an example mobile electronic device 500, in which the disclosed technology may be incorporated, including a variety of optional hardware and software components, shown generally at 502. Any components 502 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 504, such as a cellular, satellite, or other network.

The illustrated mobile device 500 can include a controller or processor 510 (e.g., signal processor, microprocessor, ASIC, or other control and processing logic circuitry) for performing such tasks as signal coding, data processing, input/output processing, power control, and/or other functions. An operating system 512 can control the allocation and usage of the components 502 and support for one or more application programs 514. The application programs can include common mobile computing applications (e.g., email applications, calendars, contact managers, web browsers, messaging applications), or any other computing application. Functionality 513 for accessing an application store can also be used for acquiring and updating application programs 514.

The illustrated mobile device 500 can include memory 520. Memory 520 can include non-removable memory 522 and/or removable memory 524. The non-removable memory 522 can include RAM, ROM, flash memory, a hard disk, or other well-known memory storage technologies. The removable memory 524 can include flash memory or a Subscriber Identity Module (SIM) card, which is well known in GSM communication systems, or other well-known memory storage technologies, such as "smart cards." The memory 520 can be used for storing data and/or code for running the operating system 512 and the applications 514. Example data can include web pages, text, images, sound files, video data, or other data sets to be sent to and/or received from one or more network servers or other devices via one or more wired or wireless networks. The memory 520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 500 can support one or more input devices 530, such as a touchscreen 532, microphone 534, camera 536 (with OIS technology 537), physical keyboard 538 and/or trackball 540 and one or more output devices 550, such as a speaker 552 and a display(s) 554. Other possible output devices (not shown) can include piezoelectric or other haptic output devices. Some devices can serve more than one input/output function. For example, a touchscreen 532 and a display 554 can be combined in a single input/output device.

The input devices 530 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 512 or applications 514 can comprise speech-recognition software as part of a voice user interface that allows a user to operate the device 500 via voice commands. Further, the device 500 can comprise input devices and software that allows for user interaction via a user's spatial gestures, such as detecting and interpreting gestures to provide input to a gaming application.

A wireless modem 560 can be coupled to an antenna (not shown) and can support two-way communications between the processor 510 and external devices, as is well understood in the art. The modem 560 is shown generically and can include a cellular modem for communicating with the mobile communication network 504 and/or other radio-based modems (e.g., Bluetooth 564 or Wi-Fi 562). The wireless modem 560 is typically configured for communication with one or more cellular networks, such as a GSM network for data and voice communications within a single cellular network, between cellular networks, or between the mobile device and a public switched telephone network (PSTN).

The mobile device can further include at least one input/output port 580, a power supply 582, a satellite navigation system receiver 584, such as a Global Positioning System (GPS) receiver, an accelerometer 586, and/or a physical connector 590, which can be a USB port, IEEE 1394 (FireWire) port, and/or RS-232 port. The illustrated components 502 are not required or all-inclusive, as any components can be deleted and other components can be added.

Figure 12:
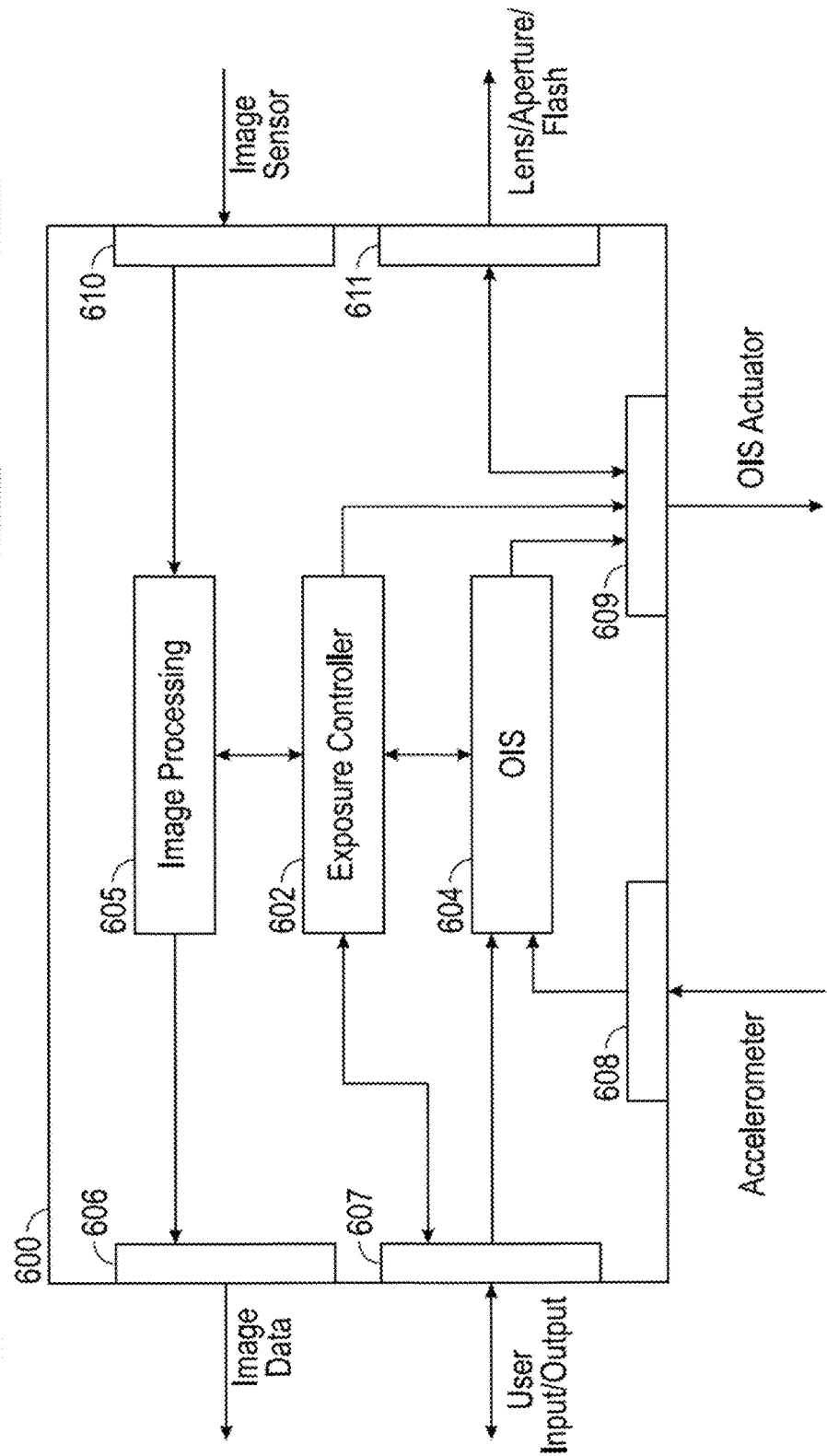
FIG. 12 is a schematic block diagram of an exemplary camera system implementing the disclosed technology.

The disclosed technology may be used with any camera device with tilt OIS hardware, and may be implemented using any combination of hardware and software. In FIG. 12, a block diagram illustrates an exemplary camera control module 600 that enables multiple exposure based depth of field effects utilizing the disclosed technology. The module 600 may be implemented as a one or more chips, and may include custom logic circuitry and/or a general- or special-purpose processor that operates on instructions (e.g., software or firmware) stored in a computer readable medium such as random access memory, non-volatile memory (e.g., flash memory). The module 600 may operate under the control of an externally-located central processor, e.g., via instructions received over an input-output bus.

The module 600 includes facilities for controlling the operations of a digital image sensor, and may also include facilities for processing the image data in real-time or near-real time to provide effects as described herein. For example, an exposure controller 602 may automatically set parameters such as exposure time, focus, flash, etc., based on data received from image sensor via interface 610. The image sensor interface 610 may provide processed or unprocessed image data from an image sensor (e.g., CCD, CMOS), and the image data may be in a low-resolution preview format, video format, and/or high-resolution final format. This data may be processed via image processing module 605, for use internally via exposure controller 602, for preview via a user input/output interface 607, and/or for output to image storage via image data interface 606.

The exposure controller 602 can receive inputs from the user and provides information to the user via the user input/output interface 507. For example, the user may select imaging effects options via a device menu and these selections may be communicated to the exposure controller 602. In response, the exposure controller 602 can examines data from the image sensor via image processing module 605. This image data can be used, for example, to provide indications to the user, such as via interface 607, of areas within the current scene that may be used to form a depth of field effect, such as for a bokeh effect. The image processing module 605 may also be configured to perform other analytics, such as shape recognition, facial recognition, and segmentation from images received via the image sensor interface 610. In such a case, the detected shape may be presented as an option for depth of field effects. For example, the image processing module 605 may be configured to determine the outline of primary subjects in the scene. This outline shape can be used to form a trace effect that paints a "halo" around the subject or makes the background around the subject out of focus.

Upon selection of an effect, the exposure controller 602 can calculates the camera parameters for the exposure and communicate these to the camera hardware via interface 611, which facilitates controlling hardware such as lens tilt, lens focus/zoom, aperture, flash, etc. The effects parameters can also be communicated to an OIS module 604, which controls scene-to-sensor displacement via an OIS actuator interface 609. During a specified time period within the exposure, the OIS module 604 directs the actuators to move in a predetermined pattern. It should be noted that the communications to the OIS module 604 may occur over a custom data interface, or may be combined with accelerometer inputs received via an accelerometer interface 608. In the latter case, the predetermined pattern may be formatted as a series of "virtual" acceleration signals that cause the OIS actuators to move as desired. The virtual acceleration signals may be combined with measured signals to reduce jitter during the effects capture.

The combination of multiple exposures to form a composite image may occur in a number of ways. Similar to traditional photographic techniques, the image sensor may be exposed to the scene during the entire period of time during which the image is formed. By using the appropriate settings and under the appropriate conditions (e.g., low light), the image can be formed over a relatively long period of time (e.g., one second or more) without being overdeveloped. In other arrangements, the effects exposure may be captured using a different mode, such as a video mode, that is integrated and buffered into a still image, and combined with the other, primary, exposure, which may be captured using a still camera mode. Buffering the effects frame/exposure may allow a number of processing operations to be performed on the effects, such as color shifting, filters, cropping, etc.

FIG. 13 illustrates a generalized example of a suitable cloud-supported environment 600 in which described embodiments, techniques, and technologies may be implemented. In the example environment 600, various types of services (e.g., computing services) are provided by a cloud 610. For example, the cloud 610 can comprise a collection of computing devices, which may be located centrally or distributed, that provide cloud-based services to various types of users and devices connected via a network such as the Internet. The implementation environment 600 can be used in different ways to accomplish computing tasks. For example, some tasks (e.g., processing user input and presenting a user interface) can be performed on local computing devices (e.g., connected devices 630, 640, 650) while other tasks (e.g., storage of data to be used in subsequent processing) can be performed in the cloud 610. Devices 630, 640, and 650 illustrate exemplary electronic devices in which the disclosed tilt OIS technology and the disclosed depth of field effect production can be implemented.

In example environment 600, the cloud 610 provides services for connected devices 630, 640, 650 with a variety of screen capabilities. Connected device 630 represents a device with a computer screen 635 (e.g., a mid-size screen). For example, connected device 630 could be a personal computer such as desktop computer, laptop, notebook, netbook, or the like. Connected device 640 represents a device with a mobile device screen 645 (e.g., a small size screen). For example, connected device 640 could be a mobile phone, smart phone, handheld gaming controller, universal remote control, personal digital assistant, tablet computer, and the like. Connected device 650 represents a device with a large screen 655. For example, connected device 650 could be a television screen (e.g., a smart television) or another device connected to a television (e.g., a set-top box or gaming console) or the like. Any of these displays devices can be used with the disclosed tilt OIS and multi-shot depth of field effect technology, for example.

One or more of the connected devices 630, 640, 650 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 600. For example, the cloud 610 can provide services for one or more computers (e.g., server computers) without displays.

Services can be provided by the cloud 610 through service providers 620, or through other providers of online services (not depicted). For example, cloud services can be customized to the screen size, display capability, and/or touchscreen capability of a particular connected device (e.g., connected devices 630, 640, 650).

In example environment 600, the cloud 610 provides the technologies and solutions described herein to the various connected devices 630, 640, 650 using, at least in part, the service providers 620. For example, the service providers 620 can provide a centralized solution for various cloud-based services. The service providers 620 can manage service subscriptions for users and/or devices (e.g., for the connected devices 630, 640, 650 and/or their respective users).

The following paragraphs further describe implementations of the disclosed methods for generating images with depth of field effects and associated cameras, OIS systems, and host electronic devices:

A. A method for generating an image with a depth of field effect, the method comprising:

capturing a first image frame of a scene with a primary subject in focus;

capturing at least a second image frame of the scene at a different tilt axis relative to the first image frame and with an alternative focus relative to the first image frame such that at least a portion of a background of the scene is out of focus; and combining pixels from the first image frame and from at least the second image frame based on a predetermined heuristic to generate a resulting image of the scene having a desired depth of field effect.

B. The method of paragraph A, wherein the at least second image frame has the background area out of focus immediately adjacent to the primary subject.

C. The method of any one of paragraphs A-B, wherein the resulting image has the primary subject in focus and a background around the primary subject out of focus.

D. The method of any one of paragraphs A-C, wherein the resulting image has a bokeh effect.

E. The method of any one of paragraphs A-D, wherein capturing at least a second image frame comprises selecting a suitable defocus pixel or point in the scene based on a desired defocus level.

F. The method of any one of paragraphs A-E, wherein the first image frame is captured with a first focus plane and the second image frame is captured with a second focus plane, the second focus plane being tilted relative to the first image frame.

G. The method of paragraph F, wherein the primary subject is in the first focus plane and in the second focus plane.

H. The method of paragraph F or paragraph G, wherein the second focus plane is tilted such that the background of the scene is farther away from the second focus plane to one side of the primary subject, causing the background to be out of focus on the one side of the primary subject.

I. The method of any one of paragraphs A-H, wherein capturing at least a second image frame comprises capturing a second image frame and a third image frame, wherein in the second image frame a first portion of the background is out of focus and wherein the third image frame a second portion of the background is out of focus.

J. The method of any one of paragraphs A-I, wherein the method comprises tilting an image capturing device between capturing the first image frame and capturing the second image frame using a tilt optical image stabilization (OIS) mechanism.

K. The method of any one of paragraphs A-J, wherein a first camera is used to capture the first image frame and a second camera is used to capture at least the second image frame, the first and second cameras being part of a common host device.

L. A multi-frame method for generating an image with a desired depth of field effect, comprising:

capturing image frames of a scene having a primary subject;

adjusting a tilt axis in between the capturing of the image frames;

determine depth map of the scene from at least some of the captured image frames;

filtering the captured image frames based on the depth map; and combining the filtered image frames to generate a resulting image with a desired depth of field effect.

M. The method of paragraph L, wherein filtering the captured image frames comprises filtering the primary subject.

N. The method of any one of paragraphs L-M, wherein filtering the captured image frames comprises filtering a background of the primary subject.

O. The method of any one of paragraphs L-N, wherein filtering the captured image frames comprises filtering the primary subject and a background of the primary subject.

P. The method of any one of paragraphs L-O, wherein the resulting image has the primary subject in focus and a background around the primary subject out of focus.

Q. A mobile electronic device comprising:

a device frame;

a camera module coupled to the device frame and comprising at least a lens and an image sensor;

a tilt optical image stabilization (OIS) system coupled to the camera module and comprising an actuator operable to tilt the camera module relative to the frame; and a processor coupled to the camera and the tilt OIS system; wherein the mobile electronic device is programmed to:

capture a first image frame of a scene with the camera with a primary subject of the scene in focus;

capture at least a second image frame of the scene with the camera at a different tilt axis relative to the first image frame and with an alternative focus relative to the first image frame such that at least a portion of a background of the scene is out of focus; and by the processor, combine pixels from the first image frame and from at least the second image frame based on a predetermined heuristic to generate a resulting image of the scene having a desired depth of field effect.

R. The device of paragraph Q, wherein the tilt OIS system is operable to tilt the camera module between the capturing of the first image frame and the capturing of at least the second image frame, based on a control signal from the processor to the actuator.

S. The device of paragraph R, further comprising a gyroscope, wherein the processor receives device motion data from the gyroscope and causes the tilt OIS system to adjust a tilt angle of the camera module relative to the device frame based at least in part on the received device motion data and at least in part on the desired depth of field effect.

T. The device of any one of paragraphs Q-S, wherein the camera module is used to capture the first image frame, and wherein the device further comprises a second camera module coupled to the device frame, and wherein the second camera module is used to capture at least the second image frame.

The disclosed methods, apparatuses, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

The terms "system" and "device" are used interchangeably herein. Unless the context clearly indicates otherwise, neither term implies any limitation on a type of computing system or computing device. In general, a computing system or device can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

In view of the many possible embodiments to which the principles of the disclosed technology may be applied, it should be recognized that the illustrated embodiments are only preferred examples of the disclosed technology and should not be taken as limiting the scope of the invention(s). Rather, the scope of the invention(s) is defined by the following claims. We therefore claim as our invention(s) all that comes within the scope of these claims.

The invention claimed is:

1. A method for generating an image with a depth of field effect, comprising:

capturing with a first focus plane a first image frame of a scene with a primary subject in focus and at least a portion of a background of the scene having a first defocus level;

capturing with a second focus plane tilted at a different tilt axis relative to the first image frame and with an alternative focus relative to the first image frame at least a second image frame of the scene such that the portion of the background of the scene has a second defocus level that is different from the first defocus level, wherein the second focus plane is tilted such that the background of the scene is farther away from the second focus plane to one side of the primary subject; and combining pixels from the first image frame and from at least the second image frame based on a predetermined heuristic to generate a resulting image of the scene having a desired depth of field effect.

2. The method of claim 1, wherein the at least second image frame has an area of the background of the scene immediately adjacent to the primary subject out of focus.

3. The method of claim 1, wherein the resulting image has the primary subject in focus and an area of the background of the scene around the primary subject out of focus.

4. The method of claim 1, wherein the resulting image has a bokeh effect.

5. The method of claim 1, wherein capturing at least a second image frame comprises selecting a defocus pixel or a point in the scene based on a desired defocus level.

6. The method of claim 1, wherein the primary subject is in the first focus plane and in the second focus plane.

7. The method of claim 1, wherein the background of the scene is out of focus on the one side of the primary subject on the second focus plane.

8. The method of claim 1, wherein capturing at least a second image frame comprises capturing a second image frame and a third image frame, wherein in the second image frame a first portion of the background of the scene is out of focus and wherein in the third image frame a second portion of the background of the scene is out of focus.

9. The method of claim 1, wherein the method comprises tilting an image capturing device between capturing the first image frame and capturing the second image frame using a tilt optical image stabilization (OIS) mechanism.

10. The method of claim 1, wherein a first camera is used to capture the first image frame and a second camera is used to capture at least the second image frame, the first and second cameras being part of a common host device.

11. A multi-frame method for generating an image with a desired depth of field effect, comprising:
  capturing image frames of a scene having a primary subject and a background;
  adjusting a tilt axis in between the capturing of the image frames, wherein a first of the image frames is captured with a first focus plane and a second of the image frames is captured with a second focus plane tilted at a different tilt axis relative to the first image frame and with an alternative focus relative to the first image frame, such that at least a portion of the background of the scene has a different defocus level in the first image frame than in the second image frame, wherein the second focus plane is tilted such that the background of the scene is farther away from the second focus plane to one side of the primary subject;
  determining a depth map of the scene from at least the first and second captured image frames;
  filtering the captured image frames based on the depth map; and
  combining the filtered image frames to generate a resulting image with a desired depth of field effect.

12. The method of claim 11, wherein filtering the captured image frames comprises filtering the primary subject.

13. The method of claim 11, wherein filtering the captured image frames comprises filtering a background of the primary subject.

14. The method of claim 11, wherein filtering the captured image frames comprises filtering the primary subject and a background of the primary subject.

15. The method of claim 11, wherein the resulting image has the primary subject in focus and a background around the primary subject out of focus.

16. A mobile electronic device comprising:
  a device frame;
  a camera module coupled to the device frame and comprising at least a lens and an image sensor;
  a tilt optical image stabilization (OIS) system coupled to the camera module and comprising an actuator operable to tilt the camera module relative to the frame; and
  a processor coupled to the camera module and the tilt OIS system;
  wherein the mobile electronic device is programmed to:
    capture with a first focus plane a first image frame of a scene with the camera with a primary subject of the scene in focus and at least a portion of a background of the scene having a first defocus level;
    capture with a second focus plane tilted at a different tilt axis relative to the first image frame and with an alternative focus relative to the first image frame at least a second image frame of the scene such that the portion of the background of the scene has a second defocus level that is different from the first defocus level, wherein the second focus plane is tilted such that the background of the scene is farther away from the second focus plane to one side of the primary subject; and
    by the processor, combine pixels from the first image frame and from at least the second image frame based on a predetermined heuristic to generate a resulting image of the scene having a desired depth of field effect.

17. The device of claim 16, wherein the tilt OIS system is operable to tilt the camera module between the capturing of the first image frame and the capturing of at least the second image frame, based on a control signal from the processor to the actuator.

18. The device of claim 17, further comprising a gyroscope, wherein the processor receives device motion data from the gyroscope and causes the tilt OIS system to adjust a tilt angle of the camera module relative to the device frame based at least in part on the received device motion data and at least in part on the desired depth of field effect.

19. The device of claim 16, wherein the camera module is used to capture the first image frame, and wherein the device further comprises a second camera module coupled to the device frame, and wherein the second camera module is used to capture at least the second image frame.

* * * * *